Patented Oct. 25, 1949

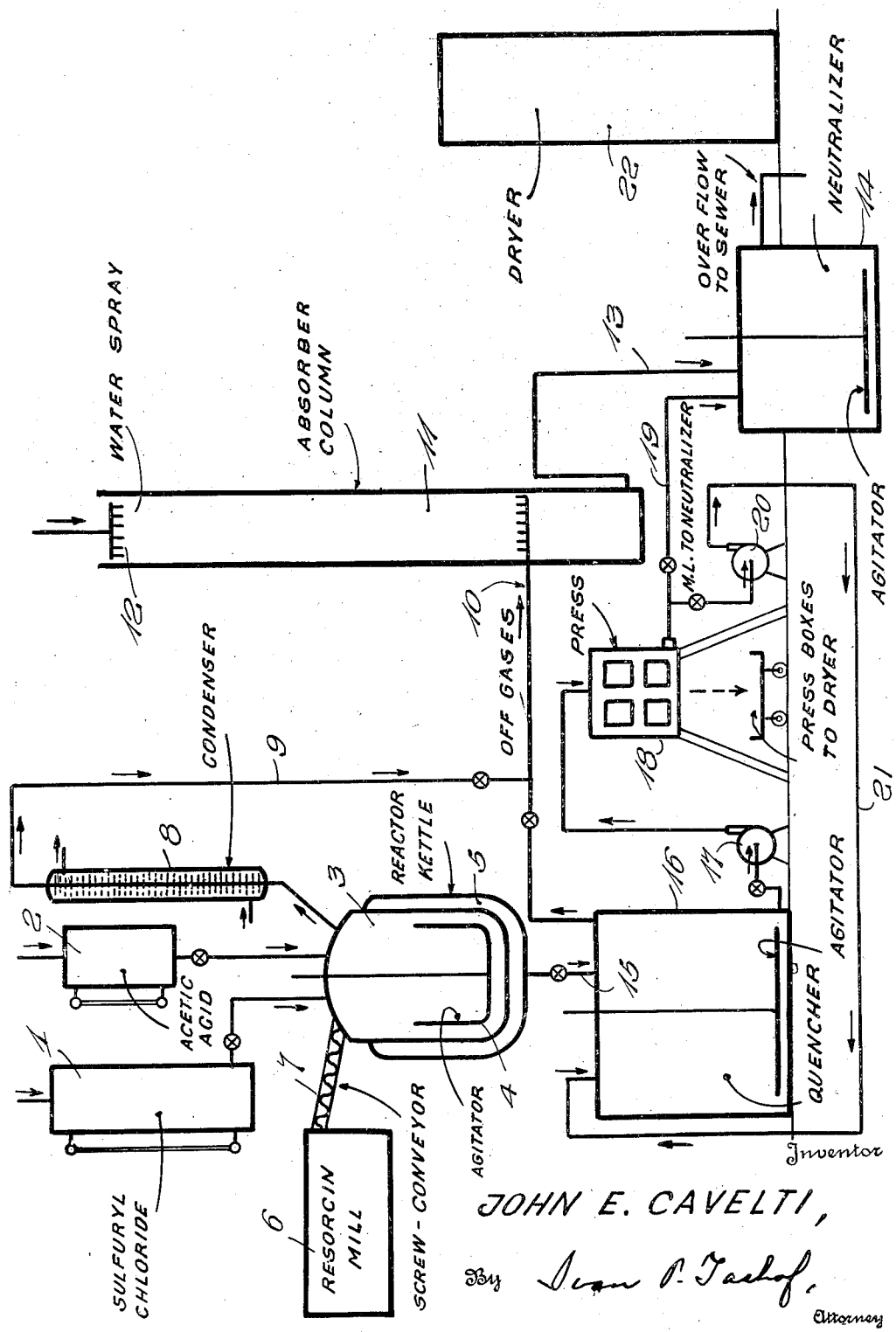

2,485,562

UNITED STATES PATENT OFFICE 2,485,562

PRODUCTION OF 2,4,6-TRICHLORO-RESORCIN

John E. Cavelti, Meadville, Pa., assignor, by mesne assignments, to Koppers Company, Inc., a corporation of Delaware Application February 26, 1946, Serial No. 650,312

22 Claims. (Cl. 260—623)

The present invention relates to the production of 2,4,6-trichlororesorcin, and more particularly to the production thereof by reacting resorcin with sulfuryl chloride in the presence of a catalyst, said catalyst comprising a saturated carboxy acid selected from the group consisting of a saturated monocarboxylic fatty acid, a saturated dicarboxylic acid, and a saturated tricarboxylic acid, the saturated monocarboxylic acid of the fatty acid series having the general formula $C_nH_{2n+1}COOH$ where "$n$" is an integer selected from a group consisting of 0, 1, 2, and 3, but preferably from a group consisting of 0, 1, and 2. Most satisfactory results are obtained when using a monocarboxylic acid of the fatty acid series. Butyric acid, $C_3H_7COOH$ or isobutyric acid has a very disagreeable odor; therefore, it can only be used when the reaction is carried on in a closed container and appropriate precautions are taken to prevent the butyric acid from affecting the operator. The saturated dicarboxylic acids as illustrated by oxalic acid preferably in its anhydrous state, and malonic acid, may be used. In the preferred form of the invention, the catalyst is acetic acid.

The primary objects of the invention are to insure that the reaction between resorcin and sulfuryl chloride produces substantially pure 2,4,6-trichlororesorcin instead of a mixture of the 2,4-dichlororesorcin and the 2,4,6-trichlororesorcin, the former predominating, that the reaction between the resorcin and sulfuryl chloride is greatly speeded, and that the process results in yields of at least 65% to 70% of substantially pure 2,4,6-trichlororesorcin.

The above objects are primarily obtained by utilizing a catalyst of the character above set forth and particularly a saturated monocarboxylic acid of the fatty acid series, the preferred catalyst being acetic acid, although other acids as hereinafter indicated may be used.

The invention will be described in connection with the accompanying drawing wherein the steps of the process are diagrammatically set forth.

In carrying out the invention, sulfuryl chloride and acetic acid are fed from measuring tanks 1 and 2 respectively to the enameled reactor 3, said reactor being provided with an agitator 4 and a temperature-control jacket 5. The reaction is carried out in an enamelled reactor so as to avoid the production of a dark colored final product which would occur if the reaction were carried out in a reactor presenting an iron surface to the reaction mass. Solid resorcin of any suitable size, as for example, 20 mesh to 4 mesh is fed from the resorcin mill 6 via the screw conveyor 7 to the reactor vessel or kettle 3.

The sulfuryl chloride and acetic acid, the latter being preferably glacial acetic acid, said constituents being in liquid form are first fed to the reactor 3, and thereafter the desired amount of resorcin is fed to the reactor so that the desired reaction may occur. It has been ascertained that it is highly desirable to feed the resorcin into a reactor into which the sulfuryl chloride and acetic acid have been introduced rather than to mix these ingredients simultaneously or to introduce the sulfuryl chloride into the mixture of resorcin and acetic acid; in the latter case the reaction proceeds to the dichlororesorcin state at which point it solidifies, and it is thereafter difficult to incorporate additional sulfuryl chloride to convert the solid dichlororesorcin to the finished trichlororesorcin product. In a run there may be introduced into the reaction kettle 3 about 400 lbs. of resorcin, about 1950 lbs. of sulfuryl chloride, and about 180 lbs. of an acid of the character herein set forth, and, more particularly, glacial acetic acid. The saturated carboxylic acid, as for example, acetic acid, is present in the above mixture in an amount equal to about 6% taken on the weight of the resorcin, sulfuryl chloride, acetic acid mixture.

From a practical standpoint, it is desirable to have sufficient acid catalyst, as for example acetic acid, present to insure that the reaction between the constituents produces 2,4,6-trichlororesorcin in yields of at least 65% to 70% of a substantially pure product with substantially no 2,4-dichlororesorcin present in the final product. In general, the acid catalyst, typified by acetic acid, may vary from 2% to 10% and preferably from 4% to 8% taken on the weight of the resorcin, sulfuryl chloride, acid mixture. From a theoretical standpoint, in order to convert the resorcin into 2,4,6-trichlororesorcin, there is required a minimum of 3 mols of the sulfuryl chloride to 1 mol of the resorcin. In practice it is desirable that there be an excess of sulfuryl chloride present in order to maintain the reacting mixture in liquid form and to offset the loss of sulfuryl chloride carried away from the reaction zone by the hydrochloric acid gas as a result of the partial vapor pressure of the sulfuryl chloride. Satisfactory results have been obtained when 4 mols of sulfuryl chloride have been reacted with 1 mol of resorcin.

It is desirable to feed the resorcin to the reactor 3 at such a rate as to insure that the resorcin will react substantially completely as rapidly as it is fed to the reactor; otherwise, there is likely to occur an accumulation of unreacted resorcin which may start reacting suddenly and with violence. It is also desirable that the initial temperature be high enough to facilitate the start of the reaction. For practical operation an initial temperature of approximately 25° C. and a rate of feed of resorcin of approximately 5 lbs. per minute is satisfactory. It is desired that the reaction be initiated and carried out at a temperature which will prevent the reaction proceeding with violence. If the resorcin does accumulate, then when the resorcin starts to react with the sulfuryl chloride, there is no adequate control, and the temperature rises excessively, and the reaction proceeds violently. Too high a temperature results in useless refluxing of the sulfuryl chloride and too low a temperature inhibits the starting of the reaction. It is desired to point out that the batch could initially be reacted at a temperature above 25° C. as long as the temperature is substantially lower than the boiling point of sulfuryl chloride, in order to avoid excessive losses of sulfuryl chloride through the condenser, it being noted that the reactor 3 is in operative connection with the reflux condenser 8 through the jacket of which is passed cold water or any other suitable cooling medium.

After initiating the reaction, the temperature of the reacting mass is allowed to rise to a temperature of approximately 65° to 67° C., that is, to a temperature below the reflux temperature for sulfuryl chloride. The temperature of the reactor kettle is then maintained below the reflux temperature for sulfuryl chloride for a period sufficient to complete the feed of the resorcin from the resorcin mill 6. In other words, the reaction in kettle 3 is initiated at about 25° C., and resorcin is continually fed thereto for a period of time until all of the 400 lbs. of resorcin has been fed to the kettle. After the reaction has been initially started, on the continued feed of the resorcin, the temperature in the reactor kettle is permitted to rise so as not to exceed 65° to 67° C. The object of increasing the temperature is to maintain the fluidity of the batch, the crystallizing point of which, at the end of the reaction, approximates 45° to 50° C. After all of the resorcin has been fed into the reactor, the reaction mass is maintained in a fluid state for a suitable period of time in order to complete the reaction of resorcin. The reaction mass, as stated, is maintained above the crystallizing point of the reaction mass and preferably between about 60° and 70° C., the most satisfactory results being obtained when the temperature is maintained at about 65° C. The time of the reaction will vary in accordance with the rate of feed of the resorcin and the temperature at which the mixture is reacted. The figures given are illustrative and may obviously be varied. For the specific reaction mass set forth and under the conditions set forth, that is, feeding the resorcin at about 5 pounds per minute, about 80 minutes are required to complete the feed of the resorcin to the kettle.

During the reaction a mixture of sulfuryl chloride, sulfur dioxide and hydrochloric acid passes to the condenser 8 in which said gases are cooled so that a substantial portion of the sulfuryl chloride will condense and return to the kettle 3. The mixture of hydrochloric acid gas and sulfur dioxide and residual sulfuryl chloride passes by means of the conduit 9 to a conduit 10 and thence to the absorber column 11 down which there is passing a spray of water 12 which washes the mixture of gases so as to remove their acidic constituents, the water and the column of gas travelling counter-currently one with respect to the other. The washed gases pass to the atmosphere at the top of the absorber column while the wash water carrying the acidic components passes by means of the conduit 13 to the neutralizer 14.

The finished reaction batch in the reactor kettle 3 passes through the conduit 15 to the agitated quencher 16 to which there has previously been charged a volume of either fresh water or wash water from a previous batch or a mixture thereof.

It is desirable to point out that the 2,4,6-trichlororesorcin monohydrate is substantially insoluble in the quenching medium, whether it be fresh water or wash water. Therefore, the quenching water dissolves out the acidic impurities as well as the by-product impurities which are completely water-soluble, leaving substantially pure 2,4,6-trichlororesorcin monohydrate in solid form. The quencher slurry in tank 16 is pumped via pump 17 to the filter press 18 where the mother liquor is removed and passes to the neutralizer 14 by means of the conduit 19. The press cake is then washed in the press 18 with fresh water in order to displace the remaining mother liquor in the cake, said wash water passing via pump 20 back to the quencher 16 via conduit 21. The washed cake of 2,4,6-trichlororesorcin monohydrate is transferred to the dryer 22 where the residual moisture is removed. Any filter can be used which will remove the mother liquor from the solid 2,4,6-trichlororesorcin monohydrate. The press cake is dried in the drier 22 at a temperature of 55° to 60° C. which produces the 2,4,6-trichlororesorcin monohydrate. The press cake may be dried by suitable means to obtain the anhydrous 2,4,6-trichlororesorcin which has a melting point of 72° C. The 2,4,6-trichlororesorcin monohydrate has a melting point of 83° C. The trichlororesorcin monohydrate is produced in accordance with the above method in good yields averaging 65% to 70% of the theoretical yield. The product is substantially pure 2,4,6-trichlororesorcin monohydrate.

The method herein described produces a 2,4,6,-trichlororesorcin monohydrate having a melting point varying from about 78° to 83° C. As the melting point of the 2,4,6-trichlororesorcin monohydrate approaches 82° or 83° C., the color of the product becomes a progressively lighter tan. The color of the pure product having a melting point of 83° C. is substantially whiter and in some of the runs the product has approached a white color. If an entirely pure 2,4,6-trichlororesorcin monohydrate is desired, it may be obtained by recrystallization from water.

The contents of the neutralizer tank 14 are neutralized with a suitable neutralizing agent, as for example, slaked lime or ground limestone before it is discarded via the overflow to the sewer.

The advantage of returning the wash water from the press 18 to the quencher 16 is that it does contain small amount (trace to 2%) of the 2,4,6-trichlororesorcin which will be recovered along with the next batch. An added advantage of returning the wash water to the quenching tank is that the 2,4,6-trichlororesorcin monohydrate is less soluble in the wash water than it is in fresh water, and the loss is reduced because of this relationship.

The structural formula for the 2,4,6-trichlororesorcin monohydrate is

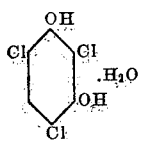

While glacial acetic acid, that is, 99% acetic acid, is the preferred acetic acid utilized as a catalyst, the invention is not restricted to glacial acetic acid as weaker acetic acid may be used; however, when the weaker acetic acid is used, the consumption of sulfuryl chloride is significantly increased; therefore, from the standpoint of a practical process the glacial acetic acid is used.

In the foregoing example, there may be substituted for the acetic acid catalyst, formic acid or propionic acid; however, formic acid is disadvantageous from the physiological standpoint as it blisters the skin upon contact and inflames the lungs when its vapors are inhaled. However, it may be used in an enclosed system where the workmen are not subjected to the effect of the formic acid. The propionic acid does not give as good a result as acetic acid as it does not speed up the reaction to the same extent that the acetic acid does.

It has been proposed to directly chlorinate resorcin with gaseous chlorine, the resorcin being dissolved in water, chloroform, or carbon tetrachloride, but none of these procedures gives a substantially pure 2,4,6-trichlororesorcin without excessive amounts of by-products. The present process has the advantage that it directly produces the 2,4,6-trichlororesorcin or the monohydrate thereof directly in a minimum of time and in substantial yields, the product being pure enough for direct utilization in the industrial arts without further purification.

When using formic acid or propionic acid as a catalyst it may be used in the proportions specified for the acetic acid; namely, 2% to 10% and preferably 4% to 8% taken on the weight of the reacting mixture. Obviously a greater amount than 10% may be used, but there is no object in having the catalyst present in any significant excess since this would only increase the cost of producing the final product.

It is desired to point out that when attempts have been made to carry out the reaction between resorcin and sulfuryl chloride under the above conditions and utilizing sulfuric acid as a catalyst, none of the desired product, namely, 2,4,6-trichlororesorcin, was obtained either in an anhydrous state or as a monohydrate.

When reacting resorcin and sulfuryl chloride with the commercial form of oxalic acid which is its dihydrate, 2,4,6-trichlororesorcin is produced, but in lower yields, indicating that side reactions have occurred. If the oxalic acid is in the anhydrous state, then reaction proceeds fairly well.

The weak organic acids appear to give good results, and by weak organic acids is meant the saturated monocarboxylic fatty acids or the saturated dicarboxylic acids of which oxalic acid and malonic acid, both used in the anhydrous state, are representative. Saturated tricarboxylic acids devoid of hydroxy groups may also be used, as for example, tricarballylic, which is propane 1,2,3-tricarboxylic acid. By a weak organic acid is meant one that does not ionize to any great extent, or, stated differently or more specifically, one whose ionization in a molar solution is less than 50%. Substituted weak acids may be used, as for example, monochloroacetic acid.

Referring to the quenching step, the aqueous quenching solution may be at room temperature or higher; however, it should not be immediately adjacent the melting point of anhydrous 2,4,6-trichlororesorcin. In view of the above, the critical feature is that the temperature should be below about 65° to 67° C. It is best that the quenching medium be maintained through a range varying from about 25° to 45° C., since the lower the temperature of quenching within said range, the lower the solubility of the 2,4,6-trichlororesorcin monohydrate in the quenching medium. It is desirable that a minimum volume of quenching water be used so that there is obtained merely a slurry of crystals only thin enough to pump.

Using carboxylic acids of the character herein set forth, the reaction may be carried out in the reactor 3 within a time period of less than three hours and preferably within a time period of less than one and one-half hours, and excellent yields of the character herein set forth are obtained. In the laboratory the reaction is carried out with yields of the character set forth in about ten to fifteen minutes. In plant operation, the reaction may be carried out in one hour to one and one quarter hours. Obviously these time periods will vary considerably depending on the plant equipment, but in all cases the employment of the catalyst of the character set forth and under the conditions set forth materially speeds up the reaction and insures that the reaction goes in the direction of the 2,4,6-trichlororesorcin. A mineral acid, such as phosphoric acid can be used, and yields of 65% to 70% of the theoretical yield of 2,4,6-trichlororesorcin will be obtained but it will take an excessively long time, varying from about seven hours to about sixteen hours. This illustrates the advantage of using a carboxylic acid as herein set forth and, preferably, one of the fatty acid series.

I claim:

1. The process of manufacturing 2,4,6-trichlororesorcin comprising reacting resorcin and sulfuryl chloride in the ratio of at least three moles of the latter for each mole of resorcin, said reaction being carried out in the presence of 2% to 10% acetic acid and while maintaining the reaction-mass in a fluid state and at a temperature below the melting point of anhydrous 2,4,6-trichlororesorcin, said percentage being taken on the weight of the reaction-mixture.

2. In a method of producing 2,4,6-trichlororesorcin by feeding resorcin into a mixture of sulfuryl chloride and a catalyst selected from the group consisting of a saturated carboxy acid of the fatty acid series, a saturated dicarboxy acid and a saturated tricarboxylic acid, the saturated monocarboxy acid of the fatty acid series having the general formula, $C_nH_{2n+1}COOH$ where "$n$" is an integer selected from the group consisting of 0, 1, 2, and 3, the steps of inhibiting a sudden violent reaction by reacting each increment of resorcin substantially completely as it is fed into said mixture, while maintaining the temperature of the reaction above about 25° C. and below the reflux temperature of sulfuryl chloride, and continuing the reaction while maintaining the reaction-mass in a fluid state and at a temperature below the melting point of anhydrous 2,4,6-trichlororesorcin.

3. In a method of producing 2,4,6-trichlororesorcin by feeding resorcin into a mixture of sulfuryl chloride and acetic acid, the steps of inhibiting a sudden violent reaction by reacting each increment of resorcin substantially completely as it is fed into said mixture, while maintaining the temperature of the reaction above about 25° C. and below the reflux temperature of sulfuryl chloride, and continuing the reaction while maintaining the reaction-mass in a fluid state and at a temperature below 70° C.

4. In a method of producing 2,4,6-trichlororesorcin by feeding resorcin into a mixture of sulfuryl chloride and acetic acid, the steps of inhibiting a sudden violent reaction by reacting each increment of resorcin substantially completely as it is fed into said mixture, while maintaining the temperature of the reaction above about 25° C. and below the reflux temperature of sulfuryl chloride, and continuing the reaction while maintaining the reaction-mass in a fluid state and at a temperature below the melting point of anhydrous 2,4,6-trichlororesorcin.

5. The process of manufacturing 2,4,6-trichlororesorcin comprising reacting resorcin and sulfuryl chloride in the ratio of at least three moles of the latter for each mole of resorcin, said reaction being carried out in the presence of acetic acid, the amount of the latter being substantially less than the amount of the sulfuryl chloride, said reaction being effected by maintaining the reaction-mass in a fluid state and at a temperature below the melting point of anhydrous 2,4,6-trichlororesorcin.

6. The process of manufacturing 2,4,6-trichlororesorcin comprising reacting resorcin and sulfuryl chloride in the ratio of at least three moles of the latter for each mole of resorcin, said reaction being carried out in the presence of acetic acid, the amount of the latter being substantially less than the amount of the sulfuryl chloride, said reaction being effected by maintaining the reaction-mass in a fluid state and at a temperature below the melting point of anhydrous 2,4,6-trichlororesorcin, washing the reaction product with wash water derived from the washing of a previous batch of reacted material to thereby remove water-soluble impurities from the reaction product, the 2,4,6,-trichlororesorcin monohydrate being less soluble in said wash water than in fresh water, and recovering from the resulting slurry a dry 2,4,6-trichlororesorcin and wash water for further use in the process.

7. In a method of producing 2,4,6-trichlororesorcin by feeding resorcin into a mixture of sulfuryl chloride and acetic acid, there being present in the resulting mixture at least three moles of sulfuryl chloride for each mole of resorcin, the steps comprising inhibiting a sudden violent reaction by reacting each increment of resorcin substantially completely as it is fed into said mixture, while maintaining the temperature of the reaction above about 25° C. and below the reflux temperature of sulfuryl chloride, continuing the reaction while maintaining the reaction-mass in a fluid state and at a temperature below the melting point of anhydrous 2,4,6-trichlororesorcin, washing the reaction product with wash water derived from the washing of a previous batch of reacted material to thereby remove water-soluble impurities from the reaction product, the 2,4,6-trichlororesorcin monohydrate being less soluble in said wash water than in fresh water, and recovering from the resulting slurry a dry 2,4,6-trichlororesorcin and wash water for further use in the process.

8. In the method of producing 2,4,6-trichlororesorcin, the step of feeding resorcin to a mixture containing sulfuryl chloride and acetic acid, there being present in the resulting mixture at least three moles of sulfuryl chloride for each mole of resorcin, the amount of the acetic acid present in the mixture being substantially less than the amount of the sulfuryl chloride, and reacting the constituents of said mixture by maintaining the reaction temperature above 25° C. and below the reflux temperature of sulfuryl chloride.

9. The process of manufacturing 2,4,6-trichlororesorcin comprising reacting resorcin and sulfuryl chloride in the ratio of at least three moles of the latter for each mole of resorcin, said reaction being carried out in the presence of 2% to 10% formic acid and while maintaining the reaction mass in a fluid state and at a temperature below the melting point of anhydrous 2,4,6-trichlororesorcin, said percentage being taken on the weight of the reaction mixture.

10. The process of manufacturing 2,4,6-trichlororesorcin comprising reacting resorcin and sulfuryl chloride in the ratio of at least three moles of the latter for each mole of resorcin, said reaction being carried out in the presence of 2% to 10% propionic acid and while maintaining the reaction mass in a fluid state and at a temperature below the melting point of anhydrous 2,4,6-trichlororesorcin, said percentage being taken on the weight of the reaction mixture.

11. In a method of producing 2,4,6-trichlororesorcin by feeding resorcin into a mixture of sulfuryl chloride and formic acid, the steps of inhibiting a sudden violent reaction by reacting each increment of resorcin substantially completely as it is fed into said mixture, while maintaining the temperature of the reaction above about 25° C. and below the reflux temperature of sulfuryl chloride, and continuing the reaction while maintaining the reaction mass in a fluid state and at a temperature below 70° C.

12. In a method of producing 2,4,6-trichlororesorcin by feeding resorcin into a mixture of sulfuryl chloride and propionic acid, the steps of inhibiting a sudden violent reaction by reacting each increment of resorcin substantially completely as it is fed into said mixture, while maintaining the temperature of the reaction above about 25° C. and below the reflux temperature of sulfuryl chloride, and continuing the reaction while maintaining the reaction mass in a fluid state and at a temperature below 70° C.

13. In a method of producing 2,4,6-trichlororesorcin by feeding resorcin into a mixture of sulfuryl chloride and formic acid, the steps of inhibiting a sudden violent reaction by reacting each increment of resorcin substantially completely as it is fed into said mixture, while maintaining the temperature of the reaction above about 25° C. and below the reflux temperature of sulfuryl chloride, and continuing the reaction while maintaining the reaction mass in a fluid state and at a temperature below the melting point of anhydrous 2,4,6-trichlororesorcin.

14. In a method of producing 2,4,6-trichlororesorcin by feeding resorcin into a mixture of sulfuryl chloride and propionic acid, the steps of inhibiting a sudden violent reaction by reacting each increment of resorcin substantially completely as it is fed into said mixture, while maintaining the temperature of the reaction above about 25° C. and below the reflux temperature of sulfuryl chloride, and continuing the reaction while maintaining the reaction mass in a fluid state and at a temperature below the melting point of anhydrous 2,4,6-trichlororesorcin.

15. In the method of producing 2,4,6-trichlororescorin, the step of feeding resorcin to a mixture containing sulfuryl chloride and formic acid, there being present in the resulting mixture at least three moles of sulfuryl chloride for each mole of resorcin, the amount of the formic acid present in the mixture being substantially less than the amount of the sulfuryl chloride, and reacting the constituents of said mixture by maintaining the reaction temperature above 25° C. and below the reflux temperature of sulfuryl chloride.

16. In the method of producing 2,4,6-trichlororesorcin, the step of feeding resorcin to a mixture containing sulfuryl chloride and propionic acid, there being present in the resulting mixture at least three moles of sulfuryl chloride for each mole of resorcin, the amount of the propionic acid present in the mixture being substantially less than the amount of the sulfuryl chloride, and reacting the constituents of said mixture by maintaining the reaction temperature above 25° C. and below the reflux temperature of sulfuryl chloride.

17. The process of manufacturing 2,4,6-trichlororesorcin comprising reacting resorcin and sulfuryl chloride in the ratio of at least three moles of the latter for each mole of resorcin, said reaction being carried out in the presence of formic acid, the amount of the latter being substantially less than the amount of the sulfuryl chloride, said reaction being effected by maintaining the reaction mass in a fluid state and at a temperature below the melting point of anhydrous 2,4,6-trichlororesorcin.

18. The process of manufacturing 2,4,6-trichlororesorcin comprising reacting resorcin and sulfuryl chloride in the ratio of at least three moles of the latter for each mole of resorcin, said reaction being carried out in the presence of propionic acid, the amount of the latter being substantially less than the amount of the sulfuryl chloride, said reaction being effected by maintaining the reaction mass in a fluid state and at a temperature below the melting point of anhydrous 2,4,6-trichlororesorcin.

19. The process of manufacturing 2,4,6-trichlororesorcin comprising reacting resorcin and sulfuryl chloride in the ratio of at least three moles of the latter for each mole of resorcin, said reaction being carried out in the presence of formic acid, the amount of the latter being substantially less than the amount of the sulfuryl chloride, said reaction being effected by maintaining the reaction mass in a fluid state and at a temperature below the melting point of anhydrous 2,4,6-trichlororesorcin, washing the reaction product with wash water derived from the washing of a previous batch of reacted material to thereby remove water-soluble impurities from the reaction product, the 2,4,6-trichlororesorcin monohydrate being less soluble in said wash water than in fresh water, and recovering from the resulting slurry a dry 2,4,6-trichlororesorcin and wash water for further use in the process.

20. The process of manufacturing 2,4,6-trichlororesorcin comprising reacting resorcin and sulfuryl chloride in the ratio of at least three moles of the latter for each mole of resorcin, said reaction being carried out in the presence of propionic acid, the amount of the latter being substantially less than the amount of the sulfuryl chloride, said reaction being effected by maintaining the reaction mass in a fluid state and at a temperature below the melting point of anhydrous 2,4,6-trichlororesorcin, washing the reaction product with wash water derived from the washing of a previous batch of reacted material to thereby remove water-soluble impurities from the reaction product, the 2,4,6-trichlororescin monohydrate being less soluble in said wash water than in fresh water, and recovering from the resulting slurry a dry 2,4,6-trichlororesorcin and wash water for further use in the process.

21. In a method of producing 2,4,6-trichlororesorcin by feeding resorcin into a mixture of sulfuryl chloride and formic acid, there being present in the resulting mixture at least three moles of sulfuryl chloride for each mole of resorcin, the steps comprising inhibiting a sudden violent reaction by reacting each increment of resorcin substantially completely as it is fed into said mixture, while maintaining the temperature of the reaction above about 25° C. and below the reflux temperature of sulfuryl chloride, continuing the reaction while maintaining the reaction mass in a fluid state and at a temperature below the melting point of anhydrous 2,4,6-trichlororesorcin, washing the reaction product with wash water derived from the washing of a previous batch of reacted material to thereby remove water-soluble impurities from the reaction product, the 2,4,6-trichlororesorcin monohydrate being less soluble in said wash water than in fresh water, and recovering from the resulting slurry a dry 2,4,6-trichlororesorcin and wash water for further use in the process.

22. In a method of producing 2,4,6-trichlororesorcin by feeding resorcin into a mixture of sulfuryl chloride and propionic acid, there being present in the resulting mixture at least three moles of sulfuryl chloride for each mole of resorcin, the steps comprising inhibiting a sudden violent reaction by reacting each increment of resorcin substantially completely as it is fed into said mixture, while maintaining the temperature of the reaction above about 25° C. and below the reflux temperature of sulfuryl chloride, continuing the reaction while maintaining the reaction mass in a fluid state and at a temperature below the melting point of anhydrous 2,4,6-trichlororesorcin, washing the reaction product with wash water derived from the washing of a previous batch of reacted material to thereby remove water-soluble impurities from the reaction product, the 2,4,6-trichlororesorcin monohydrate being less soluble in said wash water than in fresh water, and recovering from the resulting slurry a dry 2,4,6-trichlororesorcin and wash water for further use in the process.

JOHN E. CAVELTI.

REFERENCES CITED

The following references are of record in the file of this patent:

UNITED STATES PATENTS

| Number | Name | Date |
|---|---|---|
| 2,023,160 | Austin | Dec. 3, 1935 |
| 2,151,137 | Moness | Mar. 21, 1939 |
| 2,171,494 | Kyrides | Aug. 29, 1939 |

OTHER REFERENCES

Beilstein, 4th edition, vol. 6, page 820.
Reinhard: Jour. für Praktische Chemie, vol. 125, N. F. 17, 322, 323, 328, 329, 336, 337 (1878).